United States Patent [19]

Fukuhara

[11] Patent Number: 4,460,258
[45] Date of Patent: Jul. 17, 1984

[54] LENS BARREL CONTAINING AN AUTOMATIC FOCUS MATCHING DEVICE THEREIN

[75] Inventor: Toru Fukuhara, Isehara, Japan
[73] Assignee: Nippon Kogaku K.K., Tokyo, Japan
[21] Appl. No.: 465,541
[22] Filed: Feb. 10, 1983

Related U.S. Application Data

[63] Continuation of Ser. No. 361,836, Mar. 25, 1982, abandoned.

[30] Foreign Application Priority Data

Mar. 31, 1981 [JP] Japan .................... 56-44449[U]

[51] Int. Cl.³ ............................................. G03B 3/10
[52] U.S. Cl. ......................................... 354/402; 354/274
[58] Field of Search ................ 354/400–409, 354/446–448, 455, 195.1, 270, 271.1, 274; 352/140; 350/255, 449, 450

[56] References Cited

U.S. PATENT DOCUMENTS 3,435,744 4/1969 Stimson .................... 354/25 A
4,093,365 6/1978 Isono .................... 354/25 P X
4,184,753 1/1980 Hashimoto et al. ............ 354/195 X Primary Examiner—William B. Perkey
Attorney, Agent, or Firm—Shapiro and Shapiro

[57] ABSTRACT

A lens barrel includes an imaging optical system for forming an image of an object on a predetermined imaging plane through a diaphragm corresponding to a predetermined aperture value. The lens barrel is mountable to a camera body and capable, when mounted to the camera body, of making the diaphragm respond to the exposure operation of the camera. The lens barrel includes an interlocking member displaceable in response to the exposure operation, means provided in the imaging optical system for stopping down the diaphragm during the exposure operation on the basis of the predetermined aperture value in response to the displacement, and control means for moving the imaging optical system on the basis of the positional relation between the image of the object and the imaging plane and for stopping the movement during the exposure operation in response to the displacement.

9 Claims, 7 Drawing Figures

LENS BARREL CONTAINING AN AUTOMATIC FOCUS MATCHING DEVICE THEREIN

BACKGROUND OF THE INVENTION

1. Field of the Invention

This is a continuation of Ser. No. 361,836, filed Mar. 25, 1982, now abandoned.

This invention relates to improvements in an automatic focus matching device of a camera.

2. Description of the Prior Art

As such matching device, there is known a device wherein both a distance measuring device for detecting the distance to an object to be photographed and a focus adjusting device for automatically adjusting the position of a lens on the basis of the detected result are provided in a lens barrel. Such matching device can be said to be very convenient to the photographer because it enables automatic focus adjustment to be accomplished even if the lens barrel is mounted to a different camera body.

On the other hand, however, this means that the operation on the camera body side and the focus adjusting operation inside the lens barrel are independently effected, and it brings about an inconvenience during photography. That is, with the above-described matching device, after the focus adjusting operation has been started by some method or other, the focusing operation of the lens must be stopped during photography. If this is not done, the focus adjusting operation will take place even when film is being exposed to light during photography, and this may lead to a disadvantage that the lens moves and the image is blurred.

SUMMARY OF THE INVENTION

The present invention has, for its object, to provide an automatic focus matching device designed such that the focusing operation of the lens is reliably stopped when the photographing operation is started.

The invention will become fully apparent from the following detailed description thereof taken in conjunction with the accompanying drawings.

DESCRIPTION OF THE PREFERRED EMBODIMENTS

Figure 1:
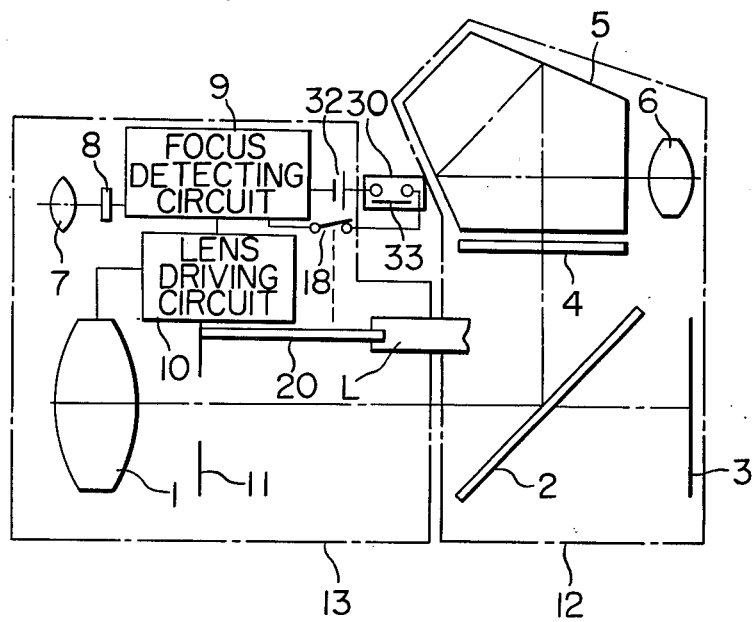
FIG. 1 shows an embodiment of the present invention.

Referring to FIG. 1, it schematically shows the construction of an embodiment of the present invention. Light passed through a phototaking objective lens 1 is reflected by a quick return mirror 2 and imaged on a focusing screen 4 disposed at a position conjugate with a film surface 3. This image may be observed by the photographer through a pentadach prism 5 and an eyepiece 6. The mirror 2, film surface 3, focusing screen 4, prism 5 and eyepiece 6 are incorporated in a camera body 12.

A detecting lens 7, a photoelectric converter 8 and a focus detecting circuit 9 are provided in a lens barrel 13 removably mountable to the camera body 12 so that a lens driving circuit 10 is operated by the output of the focus detecting circuit 9 to move the lens 1. A diaphragm device 11 provided in the lens barrel 13 rearwardly of the lens 1 is connected to a diaphragm driving lever L on the camera body side by an interlocking lever 20.

Figure 2:
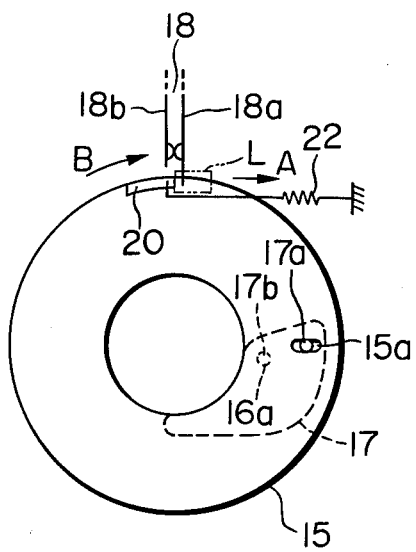
FIG. 2 is a front view showing the relation between the diaphragm device of an embodiment of the present invention and a stopping device.
Figure 3:
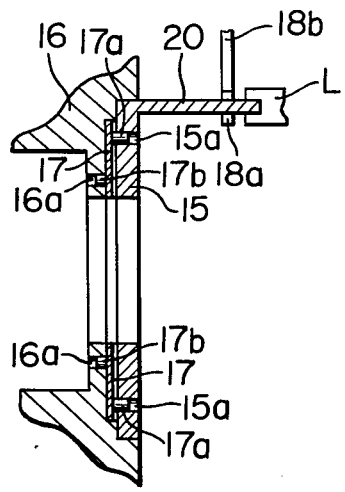
FIG. 3 is a left-hand side cross-sectional view of FIG. 2.

FIGS. 2 and 3 show an embodiment of the present invention. In the lens barrel 13, a plurality of diaphragm blades 17 are disposed between a rotatably driving plate 15 and a support member 16 and are rotatable about pins 17b with pins 17a and 17b studded in the opposite surfaces of the diaphragm blades 17 being respectively fitted in slots 15a of the driving plate 15 and circular holes 16a of the support member 16. The driving plate 15 has an interlocking lever 20 projected perpendicularly to the surface thereof, and a spring 22 is secured to the lever 20, one end of which is engaged with the diaphragm driving lever L. The diaphragm driving lever L may be moved by a predetermined stroke upon depression of a release button provided on the camera body 12 to thereby permit stop-down of the diaphragm device 11. Contact pieces 18a and 18b forming a normally closed switch 18 have one end thereof fixed to the lens barrel 13.

Figure 4:
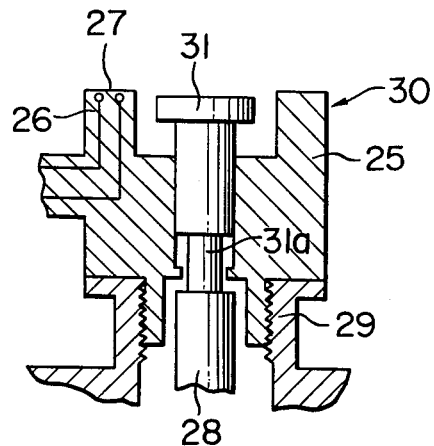
FIG. 4 is a cross-sectional view of the driving switch of an automatic focus adjusting device and a shutter release button.
Figure 5:
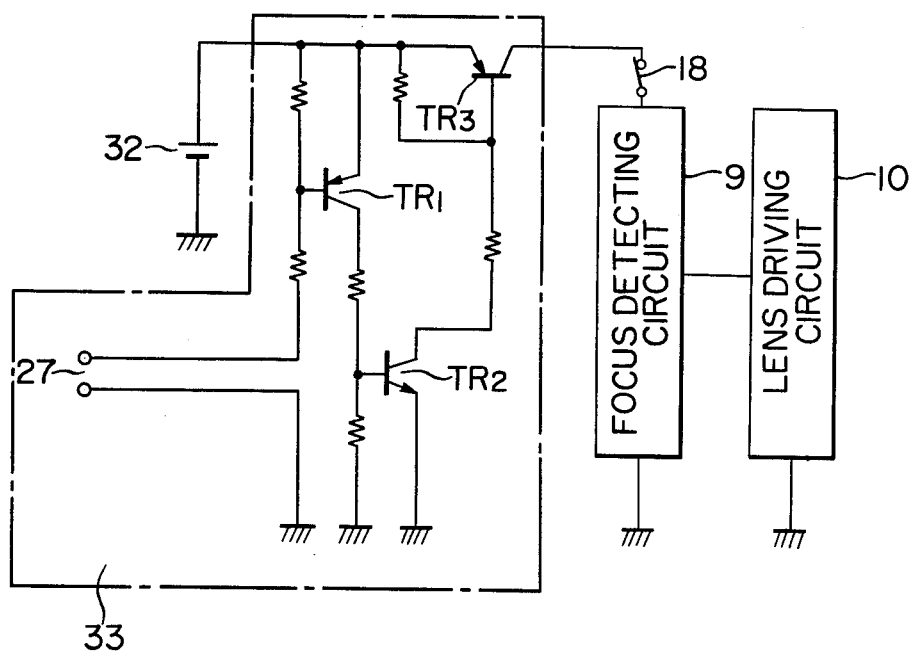
FIG. 5 is a diagram of the switch circuit of the automatic focus adjusting device.

Reference is now had to FIG. 4 to describe a release button 28 and an adapter 30 provided around it. The release button 28 and a protective ring 29 are provided on the camera body 12. An adapter body 25 is threadably engaged with the protective ring 29 disposed around the release button 28. Above the release button 28, a push button 31 is fitted to the adapter body 25. A ring-shaped protrusion 26 is formed so as to surround the button 31, and a switch 27 is provided on the upper end thereof. The lower end of the push button 31 is adapted to be in contact with the upper end of the release button 28. Thus, the adapter 30 is constituted by the body 25, the switch 27 and the button 31. When a finger is placed on the button 31, the switch 27 on the protrusion 26 is closed by the finger, and by the closing of the switch 27, transistors TR$_1$, TR$_2$ and TR$_3$ shown in FIG. 5 are turned on in the named order and the focus detecting circuit 9 is operated by a power source 32. The switch 27 and transistors TR$_1$, TR$_2$ and TR$_3$ together constitute switch means 33. The adapter 30 and the lens barrel 13 are electrically coupled to each other by a cable or the like.

To start the focus adjusting operation, a finger may touch the protrusion 26 and close the switch 27. By this, the power source 32 is connected and focus detection is effected by the detecting lens 7, the photoelectric converter 8 and the focus detecting circuit 9. Upon receipt of the output of the focus detecting circuit 9, the driving circuit 10 moves the lens 1, whereby automatic focus adjustment is accomplished so that the phototaking objective lens 1 is focused to an object to be photographed. This focus adjustment is continued as long as the finger touches the switch 27.

After having confirmed the in-focus condition by means of the display within an unshown viewfinder, the photographer depresses the push button 31 while touching the switch 27 by his finger. Thereupon, the release button 28 is depressed and the diaphragm driving lever L is released from restraint and moves by a predetermined stroke in the direction of arrow A (FIG. 2), and by the biasing force of the spring 22, the interlocking lever 20 and the driving plate 15 are moved in the direction of arrow B by an amount set by an aperture ring, and the diaphragm blades 17 are rotated and the diaphragm device 11 forms a diaphragm aperture corresponding to a set aperture value.

When the interlocking lever 20 is moved, the contact piece 18a is disengaged from the contact piece 18b thereby to open the switch 18 and cut off the power supply to the circuits 9 and 10, whereupon the automatic focus adjusting operation is stopped. The stop means of the present invention is constituted by the switch 18 and the lever 20.

When the diaphragm device 11 is stopped down, the mirror 2 is moved upwardly and a forward shutter curtain, now shown, is moved, so that the film surface 3 is exposed to light. At this time, the switch 18 is in its OFF position and therefore, the lens 1 is not moved and accordingly, the image on the film surface 3 is not blurred or out of focus. When a rearward shutter curtain, not shown, is moved to terminate the photography, the mirror 2 is moved down and the diaphragm driving lever L is returned to its original position and the diaphragm blades 17 are also returned to their original position by the interlocking lever 20 and the driving plate 15, and the switch 18 is closed, thus becoming ready for the next cycle of photography.

The above-described camera may be made into an ordinary camera of the type which is capable of photography with manual focus adjustment, by removing from the camera body 12 the adapter 30 and the lens barrel 13 capable of automatic focus matching, and mounting to the camera body 12 an ordinary lens barrel having no automatic focus matching device.

In the above-described embodiment, the switch means 33 of the adapter 30 may also be one having a timer function which will maintain the detecting circuit 9 in ON condition for a predetermined time after having brought into or out of contact with the switch 27.

It is also possible to provide one of the two terminals of the switch 27 on the body 25 and the other on the push button 31 or to provide both of the two terminals on the push button 31. In this case, when the focus adjustment is to be started, a finger may touch between the protrusion 26 and the button 31 or touch only the button 31.

Figure 6:
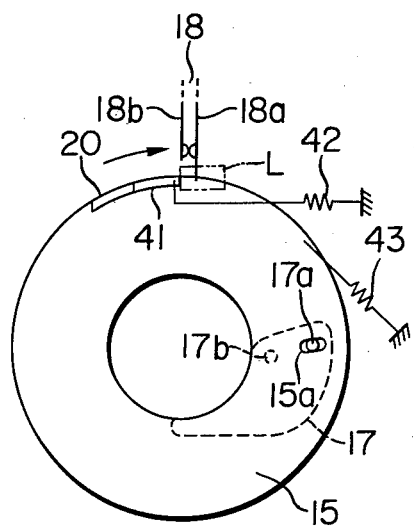
FIGS. 6 and 7 are front views showing the relation between the diaphragm devices of other embodiments of the present invention and the stopping device.

FIG. 6 shows another embodiment of the present invention. Another interlocking member 41 intervenes in suspended condition between the interlocking lever 20 and the diaphragm driving lever L, and a spring 42 is secured to this interlocking member 41. A spring 43 is secured to the driving plate 15.

According to such construction, if photography is effected with the diaphragm device 11 being fully open, that is, with the driving plate 15 being not rotated at all, the interlocking lever 20 is not moved while the interlocking member 41 alone is moved following the diaphragm driving lever L by the biasing force of the spring 42, whereby the switch 18 is opened. Accordingly, the stop means of the present invention in this case is constituted by the switch 18 and the interlocking member 41. Before photography is effected, the interlocking lever 20 and the interlocking member 41 are integrally positioned by the diaphragm driving lever L and therefore, the diaphragm device 11 is held fully open.

Figure 7:
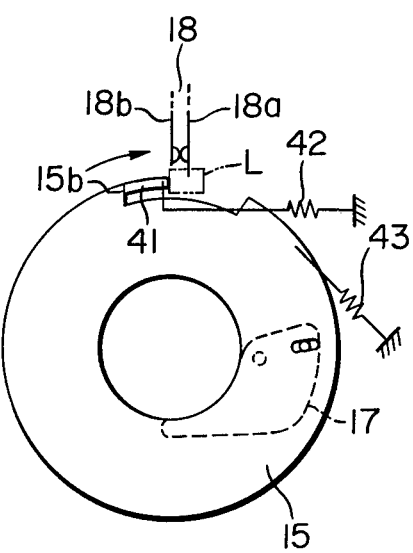

FIG. 7 shows still another embodiment of the present invention. A cut-away 15b is formed in a portion of the driving plate 15 so as to be able to permit movement of the diaphragm driving lever L and the interlocking member 41, and the lens barrel 13 is disposed with the interlocking member 41 together with the diaphragm driving lever L being disposed in suspended condition in the cut-away 15b and biased by the spring 42. When the diaphragm driving lever L is moved, the interlocking member 41 follows it and moves with the aid of the action of the spring 42 and therefore, the switch 18 is opened. The stop means is constituted by the switch 18 and the interlocking member 41. It is also possible that this is not effected by the interlocking lever 20 and the interlocking member 41 as in each of the above-described embodiments but a contactor or the like is brought into direct contact with the diaphragm driving lever L on the camera body 12 side and is connected to the switch 18. Of course, the switch contact piece 18b may also be designed to be able to directly contact the diaphragm driving lever L without the intermediary of a contactor or the like.

I claim:

1. A lens barrel including an imaging optical system for forming an image of an object on a predetermined imaging plane through a diaphragm corresponding to a predetermined aperture value, said lens barrel being mountable to a camera body and capable, when mounted to the camera body, of making said diaphragm respond to the exposure operation of the camera, said lens barrel comprising:
an interlocking member displaceable in response to said exposure operation;
means provided in said imaging optical system for stopping down said diaphragm during said exposure operation on the basis of said predetermined aperture value in response to said displacement; and
control means for moving said imaging optical system on the basis of the positional relation between the image of said object and said imaging plane and for stopping said movement during said exposure operation in response to said displacement.

2. A lens barrel according to claim 1, wherein said interlocking member includes a first displaceable member displaceable in response to said exposure operation, and a second displaceable member connected to said stop-down means and adapted to make a displacement corresponding to said aperture value in response to the displacement of said first displaceable member, said control means responds to the displacement of said first displaceable member, and said stopdown means responds to the displacement of said second displaceable member.

3. A lens barrel according to claim 1, wherein said control means includes a circuit for detecting the positional relation between the image of said object and said imaging plane and generating a detection signal, and means for moving said imaging optical system on the bases of said detection signal, said control means is operable by being supplied with energy from a power source, and said control means further includes means for cutting off the supply of said energy in response to the displacement of said interlocking member.

4. A camera system including a lens barrel including an imaging optical system for forming an image of an object on a predetermined imaging plane through a diaphragm corresponding to a predetermined aperture value, and a camera body to which said lens barrel is removably mountable, said camera system comprising:

means for effecting the exposure operation of the camera;

an interlocking member displaceable in response to said exposure operation;

means provided in said imaging optical system for stopping down said diaphragm during said exposure operation on the basis of said predetermined aperture value in response to said displacement; and control means for moving said imaging optical system on the basis of the positional relation between the image of said object and said imaging plane and for stopping said movement during said exposure operation in response to said displacement.

5. A lens barrel including an imaging optical system for forming an image of an object on a predetermined imaging plane through a diaphragm corresponding to a predetermined aperture value, said lens barrel being mountable to a camera body and capable, when mounted to the camera body, of making said diaphragm respond to an operation for starting a film exposure, said lens barrel comprising:

an interlocking member displaceable in response to said operation for starting the film exposure;

means for stopping down said diaphragm to a stop-down position to provide said predetermined aperture value in response to said displacement of said interlocking member, the stop-down means keeping said diaphragm at said stop-down position until said film exposure has been completed; and control means for moving said imaging optical system on the basis of the positional relation between the image of said object and said imaging plane and for stopping said movement in response to the displacement of said interlocking member until said film exposure has been completed.

6. A lens barrel according to claim 5, wherein said control means includes means for detecting the positional relation between the image of said object and said imaging plane and for generating a detection signal, and means for moving said imaging optical system on the basis of said detection signal, said control means being operable by being supplied with energy from a power source, and said control means further including means for cutting off the supply of said energy in response to the displacement of said interlocking member.

7. A lens barrel according to claim 5, wherein said interlocking member returns to its original position in response to the completion of said film exposure, said stop-down means releasing said diaphragm from its stop-down position in response to the returning of said interlocking member and said control means permitting said movement in response to the return of said interlocking member.

8. A lens barrel according to claim 5, wherein said interlocking member includes a first displaceable member displaceable in response to the operation for starting said film exposure, and a second displaceable member connected to said stop-down means and adapted to make a displacement corresponding to said aperture value in response to the displacement of said first displaceable member, said control means responding to the displacement of said first displaceable member, and said stop-down means responding to the displacement of said second displaceable member.

9. A camera system including a lens barrel, an imaging optical system for forming an image of an object on a predetermined imaging plane through a diaphragm corresponding to a predetermined aperture value, and a camera body to which said lens barrel is removably mountable, said camera system comprising:

operating means for exposing film;

an interlocking member displaceable in response to said operating means;

means for stopping down said diaphragm to a stop-down position providing said predetermined aperture value in response to said displacement, film exposure starting after said diaphragm has been stopped down and said stop-down means keeping said diaphragm at said stop-down position until the film exposure has been completed; and control means for moving said imaging optical system on the basis of the positional relation between the image of said object and said imaging plane and for stopping said movement in response to the displacement of said interlocking member until a film exposure has been completed.

* * * * *